(12) United States Patent
Man

(10) Patent No.: US 11,848,738 B2
(45) Date of Patent: Dec. 19, 2023

(54) APPARATUS AND METHOD FOR DIVERSITY ANTENNA SELECTION

(71) Applicant: Thomson Licensing, Cesson-Sevigne (FR)

(72) Inventor: Deshuang Man, Carmel, IN (US)

(73) Assignee: Thomson Licensing, Cesson-Sevigne (FR)

( * ) Notice: Subject to any disclaimer, the term of this patent is extended or adjusted under 35 U.S.C. 154(b) by 47 days.

(21) Appl. No.: 17/771,515

(22) PCT Filed: Oct. 20, 2020

(86) PCT No.: PCT/EP2020/079451
§ 371 (c)(1),
(2) Date: Apr. 25, 2022

(87) PCT Pub. No.: WO2021/083728
PCT Pub. Date: May 6, 2021

(65) Prior Publication Data
US 2022/0416874 A1 Dec. 29, 2022

Related U.S. Application Data

(60) Provisional application No. 62/928,423, filed on Oct. 31, 2019.

(51) Int. Cl.
*H04B 7/08* (2006.01)
(52) U.S. Cl.
CPC ................................. *H04B 7/0811* (2013.01)

(58) Field of Classification Search
CPC .. H04B 7/0811; H04B 7/0608; H04B 17/336; H04B 7/0814; H04L 1/20; H04L 27/14
See application file for complete search history.

(56) References Cited

U.S. PATENT DOCUMENTS

| 8,676,142 | B2* | 3/2014 | Rudberg | H04B 7/0811 455/272 |
|---|---|---|---|---|
| 8,964,913 | B1 | 2/2015 | Feng et al. | |
| 9,306,619 | B2 | 4/2016 | Gach et al. | |
| 2003/0119468 | A1* | 6/2003 | Meehan | H04B 7/0811 455/278.1 |
| 2004/0266374 | A1* | 12/2004 | Saed | H04B 7/0811 455/562.1 |

(Continued)

*Primary Examiner* — Khanh C Tran
(74) *Attorney, Agent, or Firm* — Vincent Edward Duffy

(57) ABSTRACT

A method and apparatus for diversity antenna selection and include receiving a first portion of a signal using a first antenna during a first time period and using a second antenna during a second time period, determining a first difference value for the first portion received by the first antenna, the first value being a difference between a signal level for the first portion received by the first antenna and a threshold signal level associated with the first antenna, and determining a second difference value for the first portion received by the second antenna, the second value being a difference between a signal level for the first portion received by the second antenna and a threshold signal level associated with the second antenna. The method and apparatus include receiving a second portion of the signal using the first antenna if the first difference value is greater than the second difference value.

20 Claims, 7 Drawing Sheets

(56) References Cited

U.S. PATENT DOCUMENTS

| | | | |
|---|---|---|---|
| 2008/0144753 A1* | 6/2008 | Saed | H04B 7/0811 |
| | | | 375/347 |
| 2009/0258627 A1* | 10/2009 | Hanusch | H04B 7/0814 |
| | | | 455/277.1 |
| 2015/0207553 A1* | 7/2015 | Watanabe | H04W 24/08 |
| | | | 370/252 |

* cited by examiner

APPARATUS AND METHOD FOR DIVERSITY ANTENNA SELECTION

This application claims the benefit, under 35 U.S.C. § 365 of International Application PCT/EP2020/079451, filed Oct. 20, 2020, which was published in accordance with PCT Article 21(2) on May 6, 2021, in English and which further claims the benefit of provisional application U.S. 62/928,423, filed on Oct. 31, 2019.

FIELD

The present disclosure generally relates to communication systems, and more particularly, to a method and apparatus for antenna selection as part of an antenna switching diversity system in an electronic device.

BACKGROUND

Any background information described herein is intended to introduce the reader to various aspects of art, which may be related to the present embodiments that are described below. This discussion is believed to be helpful in providing the reader with background information to facilitate a better understanding of the various aspects of the present disclosure. Accordingly, it should be understood that these statements are to be read in this light.

Today, modem devices, such as cable modems, offer internet connectivity to subscribers' homes. These modem devices are typically connected to an information distribution network, such as a coaxial cable network, an optical fiber network, a hybrid fiber/coaxial cable network, or a wireless network, and communicate with a network device outside the home (e.g., a termination system, such as a cable modem termination server (CMTS)). Within the home, the modem device may be connected to an in-home network, such as an Ethernet network, a coaxial cable network (e.g., using the Multimedia over Coax Alliance (MoCA) specification), wireless network (e.g., using the Institute of Electrical and Electronics Engineers (IEEE) standard 802.11), etc. Various devices within the home may use the in-home network to ultimately communicate with other devices using the in-home network or with other external network devices outside the home. Additionally, the modem device may provide telephone and other services to the home (e.g., Voice over IP (VoIP) services). Such multi-function modem devices are commonly referred to as home gateways or gateway devices.

One popular application for home gateways in a home network involves controlling home monitoring, home automation, or energy management devices using a short range low power wireless communication network, also called a wireless personal area network (WPAN). One of the several available communication protocols for use in WPAN is the Zigbee protocol or specification. Zigbee is a suite of high level communication protocols based on the IEEE standard 802.15.4 specification used to create a WPAN with small, low-power digital radios. The technology defined by the Zigbee protocol is intended to be simpler and less expensive than other WPAN protocols, such as Bluetooth, or more general wireless networking, such as Wi-Fi or IEEE standard 802.11. Its low power consumption limits transmission distances to less than 20 meters and is generally limited to a 250 kilobits/second data rate operating in a frequency around 2.4 Gigahertz (GHz).

The inclusion of two or more antennas that utilizes diversity techniques, including switching diversity techniques, can further improve the performance of Zigbee in a WPAN. In one diversity switching technique, the transceiver in the wireless device continuously switches between the two or more antennas while searching for the preamble of a signal transmitted by another wireless device connected to the network using the Zigbee protocol. When a sufficiently strong signal is received, the transceiver maintains the current antenna switch position to receive the remaining data payload for the signal. The transceiver may return to continuously switching between the two or more antennas after completion of the receipt of the data payload for the transmitted signal.

However, employing switching diversity techniques for WPAN using Zigbee often includes some issues and drawbacks, particularly when used in small electronic devices. Electronic devices may often incorporate the antennas as part of the internal structure of the device in order to reduce user set up issues and cost. Further, the small size of the electronic device limits placement of the antennas and forces the antennas to be in close proximity to metallic surfaces and other nearby objects along with noise generating electronics. The limited antenna placement options and close proximity of the antennas to other structures may result in additional noise, interference, or reduced effective antenna efficiency in one or more of the antennas relative to the other antennas in the electronic device.

Switching diversity antenna systems use an antenna selection algorithm that applies equal weighting or an equal or common signal threshold for each of the antennas. Applying the equal weighting or common signal threshold approach may result in lower operational performance from the switching diversity system due to the antenna placement limitation issues described above. Additional noise level in one of the antennas will result in a higher number of instances selecting that one antenna based on exceeding the common signal threshold. However, the additional noise present in the received signal for that antenna may actually result in a lower signal to noise ratio for the signal received by that one antenna. The lower signal to noise ratio may result in lower data throughput caused by additional data errors following demodulation and decoding of the signal. In extreme noise level situations, the signal received at the selected antenna using the equal weighting algorithm may not be able to be acquired and demodulated resulting in the need for additional retransmissions, loss of efficiency, and loss of available network capacity or bandwidth. Further, the small packet size and need to make the antenna selection during the short preamble typically used in WPANs including Zigbee further limits the ability of wireless device to determine a more accurate received signal characteristic, such as signal to noise ratio, prior to the start of reception of the data payload in the signal. Therefore, a need exists for an improved switching diversity technique for use as part of selecting an antenna for signal reception that is more effective in low power applications employed in small wireless electronic devices, such as home gateways and gateway devices.

SUMMARY

These and other drawbacks and disadvantages presented by diversity antenna systems in electronic devices are addressed by the principles of the present disclosure, which are directed to an antenna assembly in a vertical electronic device. However, it can be understood by those skilled in the art that the present principles may offer advantages in other antenna systems in other devices as well.

According to an implementation a method is described. The method includes receiving a first portion of a signal using a first antenna during a first time period and using a second antenna during a second time period. The method additionally includes determining a first difference value for the first portion of the signal received by the first antenna, the first difference value being a difference between a signal level for the first portion of the signal received by the first antenna and a threshold signal level associated with the first antenna and determining a second difference value for the first portion of the signal received by the second antenna, the second difference value being a difference between a signal level for the first portion of the signal received by the second antenna and a threshold signal level associated with the second antenna. The method further includes receiving a second portion of the signal using the first antenna if the first difference value is greater than the second difference value.

According to an implementation a networking apparatus is described. The networking apparatus includes a receiving circuit, a first and second antenna coupled to the receiving circuit, and a switch for coupling the first and second antenna to the receiving circuit. The networking apparatus additionally includes a signal processing circuit coupled to the receiving circuit, the signal processing circuit determining a first difference value for a first portion of a signal received using the first antenna when coupled to the receiving circuit during a first time period, the first difference value being a difference between a signal level for the first portion of the signal received using the first antenna and a threshold signal level associated with the first antenna, the signal processing circuit further determining a second difference value for the first portion of the signal received using the second antenna when coupled to the receiving circuit during a second time period, the second difference value being a difference between a signal level for the first portion of the signal received using the second antenna and a threshold signal level associated with the second antenna. The receiving circuit additionally receives a second portion of the signal using the first antenna when the signal processing circuit determines that the first difference value is greater than the second difference value.

According to an implementation an apparatus is described. The apparatus includes a memory that stores a threshold value associated with a first antenna and a threshold value associated with a second antenna. The apparatus further includes a processor configured to determine a first difference value for a first portion of a signal received using a first antenna when coupled to a receiving circuit during a first time period, the first difference value being a difference between a signal level for the first portion of the signal received using the first antenna and a threshold signal level associated with the first antenna, determine a second difference value for the first portion of the signal received using a second antenna when coupled to the receiving circuit during a second time period, the second difference value being a difference between a signal level for the first portion of the signal received using the second antenna and a threshold signal level associated with the second antenna. The processor is further configured to provide instructions to select the first antenna for receiving a second portion of the signal if the first difference value is greater than the second difference value.

BRIEF DESCRIPTION OF THE DRAWINGS

The above and other aspects, features, and advantages of the present disclosure will become more apparent in light of the following detailed description when taken in conjunction with the accompanying drawings in which.

DETAILED DESCRIPTION

Figure 1:
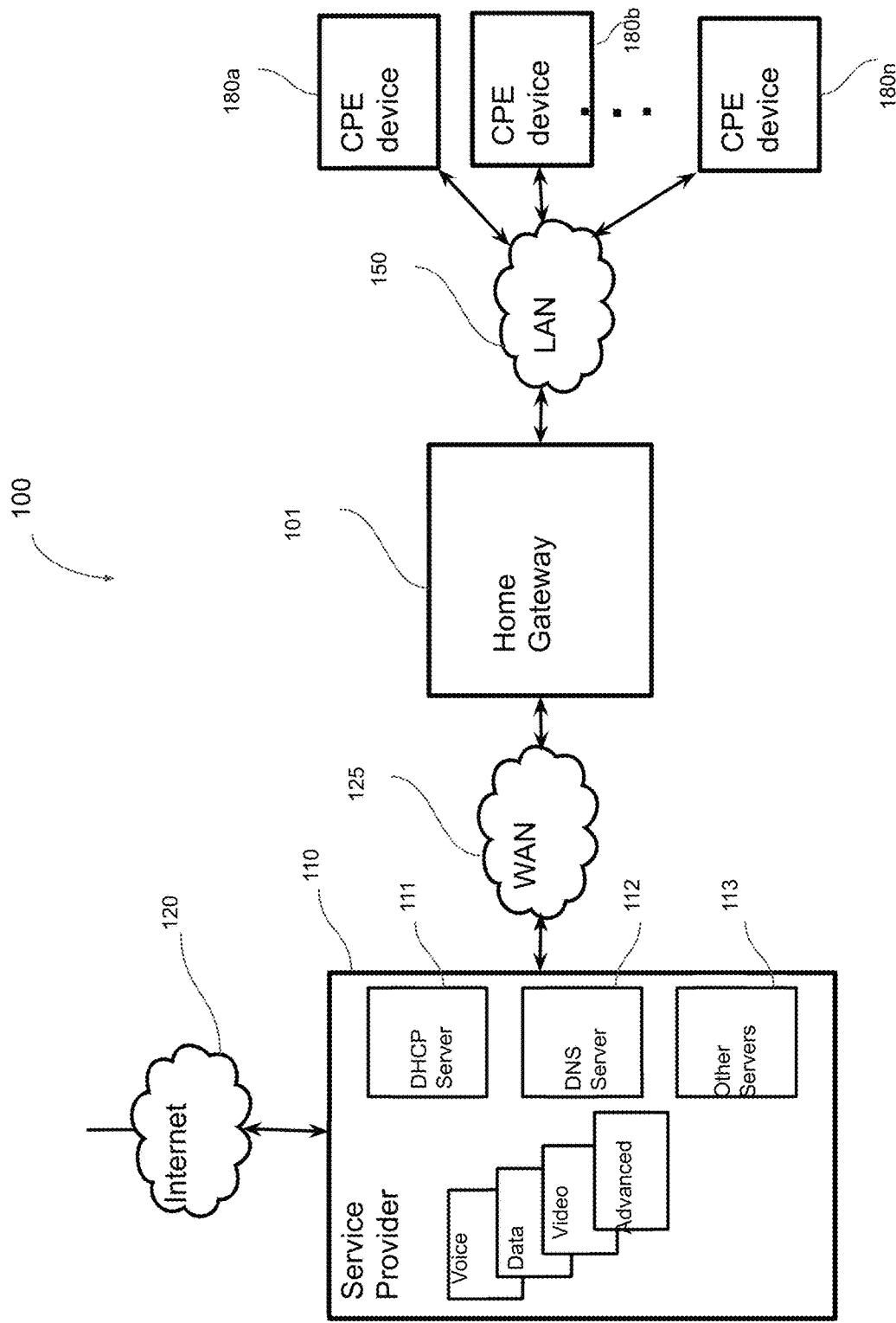
FIG. 1 is a block diagram of a networking communication system to which the principles of the present disclosure are applicable.

It should be understood that the elements shown in the figures may be implemented in various forms of hardware, software or combinations thereof. Preferably, these elements are implemented in a combination of hardware and software on one or more appropriately programmed general-purpose devices, which may include a processor, memory and input/output interfaces. Herein, the phrase "coupled" is defined to mean directly connected to or indirectly connected with one or more intermediate components. Such intermediate components may include both hardware and software based components.

The present description illustrates the principles of the present disclosure. It will thus be appreciated that those skilled in the art will be able to devise various arrangements which, although not explicitly described or shown herein, embody the principles of the disclosure and are included within its spirit and scope.

All examples and conditional language recited herein are intended for educational purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative system components and/or circuitry embodying the principles of the disclosure. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor", "module" or "controller" should not be construed to refer exclusively to hardware capable of executing software, and may implicitly include, without limitation, a System on a Chip (SoC), digital signal processor ("DSP") hardware, read only memory ("ROM") for storing software, random access memory ("RAM"), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the embodiments hereof, any element expressed or described, directly or indirectly, as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

The present embodiments address problems associated with diversity antenna systems, including switching diversity systems, that utilize a uniform or common antenna selection criteria for each of the antennas in the system, such as a common threshold signal level. In these systems, additional noise and/or interference that is present and received, along with the signal transmitted from another wireless device, at one of the antennas with respect to the other antennas will not be taken into account as part of the selection criteria. The additional noise and/or interference signal energy at the one antenna increases the aggregate received signal level and results in artificially and incorrectly meeting or exceeding the selection criteria (e.g., signal level threshold). As a result, in some cases, the most optimum antenna is not selected for receiving the signal. Further, the non-optimal selection of an antenna based on receiving a signal that includes additional noise and interference may hinder reception performance for the signal. The additional noise and/or interference present in the received signal for the non-optimal selected antenna also results in a lower signal to noise ratio for the signal representing the desired network transmitted signal. The lower signal to noise ratio may cause additional packet errors after demodulating and decoding the signal resulting in lower data throughput. In some cases it is possible that the portion of the received signal energy level representing the signal transmitted from the wireless desire, in the absence of the additional noise and/or interference may not meet the selection criteria resulting in difficulty or even inability to demodulate and decode the signal to recover the data. The failure to properly recover the data from the signal results in additional retransmissions, loss of efficiency, and loss of available network capacity or bandwidth. Further, many signal transmission protocols, such as Zigbee, use a small data payload or packet size along with a short preamble and require the antenna selection to be made during the preamble. The small packet size and short preamble further hinder the ability of the signal receiving system to determine a received signal characteristic, such as signal to noise ratio, prior to the reception of the data payload portion of the received signal.

The present disclosure is directed to embodiments for selecting an antenna as part of a diversity antenna system (e.g., a switching diversity antenna system) used in an electronic device, such as a home gateway or gateway device. The embodiments determine a first difference value for a signal received using a first antenna. The determination may include initially detecting the presence of a specific signal transmitted from a wireless device, such as signal complying with the Zigbee protocol from a home automation device. The transmitted signal may include one or more frames or packets of data with each frame or packet including an initial of first portion or segment, referred to as the preamble, and the remaining portion or remaining segments, referred to as the data payload. The first difference value may be defined as the difference between a signal level for the signal received using the first antenna and a threshold signal level associated with the first antenna. The signal is further received using the first antenna while it is coupled to a transceiver circuit during a first time period of the initial portion of the frame of data.

The embodiments in the present disclosure additionally determine a second difference value for the signal received using a second antenna instead of the first antenna. The second difference value may be defined as the difference between a signal level for the signal received using the second antenna and a threshold signal level associated with the second antenna The signal is further received while the second antenna is coupled to the transceiver during a second time period of the initial portion of the frame of data. In some cases, the second antenna may be coupled to the transceiver in place of the first antenna and the second time period may be a time period subsequent to the first time period.

The embodiments in the present disclosure further receive a second or remaining portion of the frame of data (e.g., the data payload) using the first antenna if the first difference value is greater than the second difference value. In some cases, the first antenna may be coupled to the transceiver in place of the second antenna as part of receiving the remaining portion of the frame of data. The embodiments are particularly suited for use in low power wireless networks or WPANs, including networks used for managing and controlling home devices. The embodiments are also particularly beneficial for switching diversity antenna systems used in small electronic devices having limited flexibility in antenna placement, such as electronic devices (e.g., home gateways and gateway devices) with antennas positioned internal to the mechanical structure of the device and in close proximity to metallic structures and noise generating electronic circuits.

Although the embodiments will primarily describe the present disclosure operating as part of a gateway device employing a Zigbee signal protocol for low power wireless communications in the home network, other embodiments may easily be adapted by one skilled in the art based on the teachings of one or more aspects of the present disclosure. For example, the present disclosure may be included in other home network connected devices including, but not limited to, access points, cable modems, and set top boxes. Further, with some modifications, aspects of the present disclosure may be adapted to operate with different low power wireless communication protocols, such as Bluetooth, Z-wave, or Thread, as well as different higher power, higher range wireless communication protocols, such as IEEE 802.11 or Wi-Fi.

Turning to FIG. 1, a block diagram of an exemplary networking communication system 100 according to aspects of the present disclosure is shown. Networking communication system includes a home gateway 101. Home gateway 101 is an advanced cable gateway, media gateway, home media server, cable modem router, DSL modem router, or the like, and is coupled through a wide area network (WAN) link 125 to service provider 110. Service provider 110 may be incorporated into, or include, one or more CMTS devices. WAN link 125 may be any one or more of the possible communication links including, but not limited to, coaxial cable, fiber optic cable, telephone line, or over the air (e.g., wireless or terrestrial) links. Home gateway 101 is also coupled through a local area network (LAN) link 150 to one or more customer premises equipment (CPE) devices 180a-n. LAN 150 operates as a home network in the customer premises and preferably includes a wireless communication link but may also include wired communication links using coaxial cable, optical cable, or telephone twisted pair wire. CPE devices 180a-n may include, but are not limited to, personal computers, network printers, digital set-top boxes, and/or audio/visual media servers and players, television display devices, wired phones, wireless phones, and tablets.

Service provider 110 provides one or more services over WAN link 125 to CPE devices 180A-N through home gateway 101 and home network 150. The one or more services may be provided to service provider 110 over the Internet 120, or may be provided using a broadcast communications network (not shown). The one or more services may include media and and/or data content, and content, such as voice, data, and video content, and/or various other advanced and bidirectional data and/or content. Service provider 110 may provide one or more of the services and content using one or more Internet protocols and server structures such as a dynamic host configuration protocol (DHCP) server 111, DNS server 112. as well as other servers 113 (e.g., video on demand, news, weather). It is to be appreciated that these servers, along with the associated services that are provided, may be co-located or widely distributed, physically and/or virtually, in both hardware and software. In some embodiments, service provider 110 operates in accordance with the data over cable service interface specification (DOCSIS) standard. In such embodiments, service provider 110 may be referred to as a cable multiple service operator (MSO).

Home gateway 101 provides an interface between WAN link 125 external to the customer's home and LAN link 150 operating as a home network in the customer's home. Home Gateway 101 allows data, voice, video and audio communication between service provider 110 through WAN link 125 and CPE devices 180a-n through LAN link 150 used in the customer's home, such as those described above. Home gateway 101 converts transport data packets, such as packets in an IP protocol described above, from a format used for communication over WAN link 125 to a format used by CPE device 180a-n over LAN link 150. Home gateway 101 also filters and routes data packets, including the converted data packets, for specific delivery to and between one or more of the CPE devices 180a-n connected to LAN link 150 as part of the home network. Home gateway 101 may include interfaces for both wired networking (e.g., Ethernet or Multimedia over Coaxial cable Alliance (MoCA), and the like) and wireless networking in one of the available frequency bands (e.g., 900 Megahertz (MHz), 1.5 GHz, 2.4 GHz, 5 GHz, 60 Ghz, and the like). Home Gateway 101 manages data, voice, video and audio communication between LAN link 150 and CPE devices 180A-N used in the customer's home, such as analog telephones, televisions, computers, and the like. It is important to note that LAN link 150 may be configured to support more than one different network protocol, including more than one wireless network protocol simultaneously.

In an embodiment, home gateway 101 may include components to implement an antenna diversity system used with one or more of the wireless networks as part of LAN link 150. Home gateway 101 may implement an antenna selection mechanism that includes receiving a first portion of a signal (e.g., a preamble) using a first antenna during a first time period. The mechanism additionally determines a first difference value for the first portion of the signal received by the first antenna, the first difference value being a difference between a signal level for the first portion of the signal received by the first antenna and a threshold signal level associated with the first antenna. The mechanism also determines difference values for each of the remaining antennas in the antenna diversity system in a manner similar to that used for the first antenna. The time period used by each of the antennas for receiving the signal may be different and/or may be consecutive or sequential periods of time to the first time period associated with the first antenna during the first portion of the signal. It is important to note that the threshold values for each of the antennas may be different and may be determined based on inherent noise and interference levels present at each of the antennas during a time period when signal is not being transmitted by any wireless devices. The mechanism further determines if the first difference value, determined for the first antenna, is greater that the difference values for the other antennas and, if this is the case, selects the first antenna for receiving the second or remaining portion (e.g., the data payload) of the frame of data. It is important to note that the mechanism determines and selects the antenna for receiving the second portion of the signal based on identifying the antenna from the set of antennas based on the difference values determined for the antennas, including selecting the antenna that has the greatest or largest determined difference value.

It is to be appreciated that in some configurations, the home gateway 101 may be partitioned into two separate devices coupled together in some communicative manner. The first device, connected to WAN link 125, may be referred to as a modem or network termination device (NTD). The modem or NTD portion may be located external to the customer premises. The second device, connected to LAN link 150, may be referred to as a home router, a home server, or LAN gateway.

Figure 2:
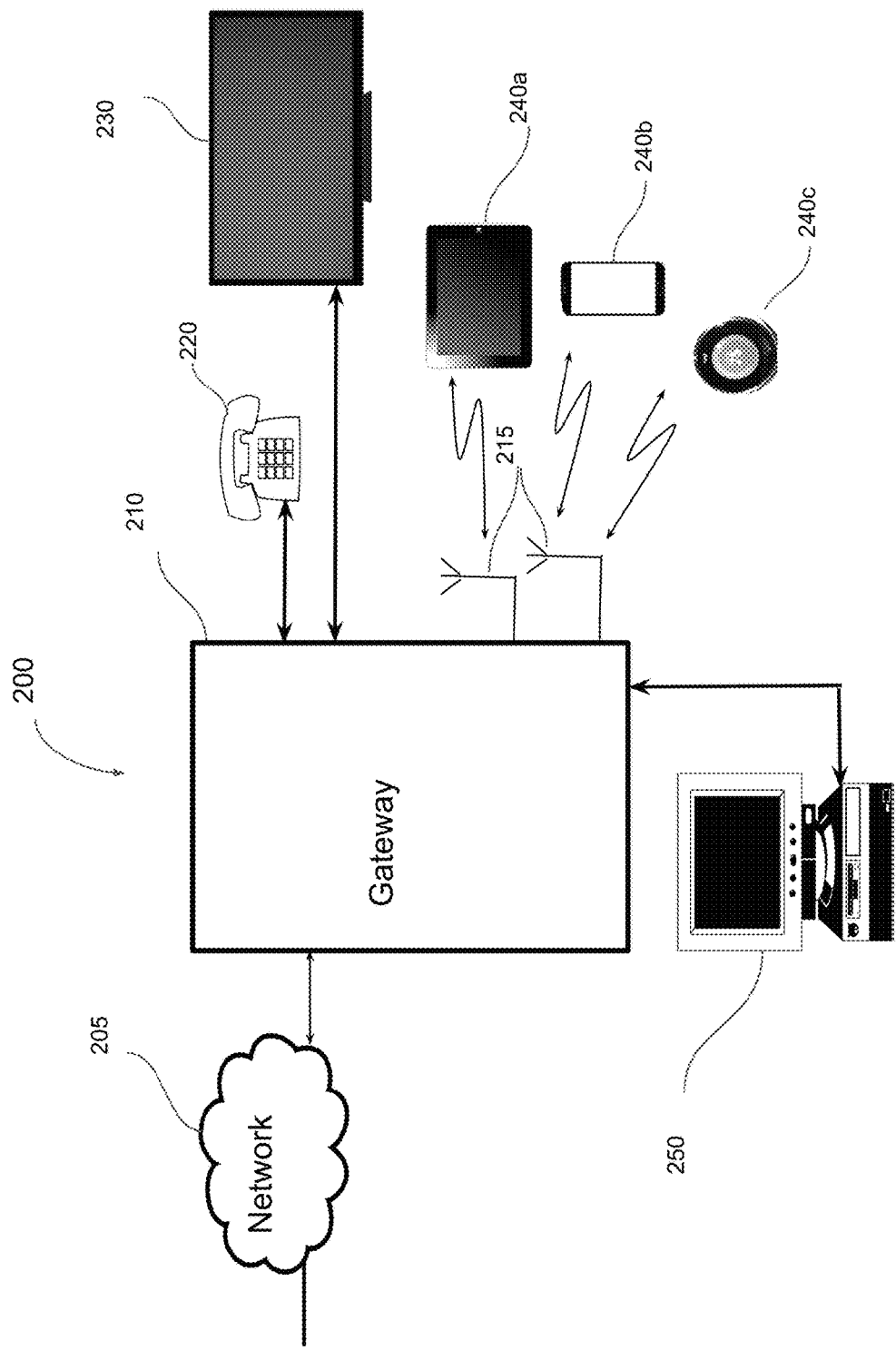
FIG. 2 is a block diagram of a gateway system to which the principles of the present disclosure are applicable.

Turning to FIG. 2, a gateway system 200 according to aspects of the present disclosure is shown. Gateway system 200 operates in a manner similar to Home Gateway 101 and CPE devices 240a-c operate in a manner similar to CPE devices 180a-n described in FIG. 1. In gateway system 200, network 205 is communicatively coupled to gateway 210. Gateway 210 is communicatively coupled to phone device 220 as well as television display device 230. Gateway 210 further interfaces with wireless devices 204a-204c through a wireless interface using one or more antennas 215. Gateway 210 is also communicatively coupled to computer 250.

Gateway system 200 provides a network interface between network 205, operating as a wide area network, from a service provider (e.g., service provider 110 described in FIG. 1) and the various communication media used to transfer voice, video, data, and any other advanced services and content to the user devices (e.g., phone device 220, television device 230, wireless devices 204a-204c, and computer 250) as part of a home network (e.g., LAN 150 described in FIG. 1). Gateway 210 includes an interface for connecting with a head end, CMTS, or home office device (not shown), through network 205. using a long haul communication medium, including, but not limited to, any combination of coaxial cable, telephone line, and optical cable or fiber. The head-end, CMTS, or home office device is part of the service provider equipment (e.g., service provider 110 described in FIG. 1). Gateway 210 provides the necessary processing to filter, parse, and transfer media content and/or data between network 205 and the user devices in the home network. Gateway 210 may include various signal processing functions including, but not limited to, digital audio and video signal decoding, encoding, and transcoding, digital rights management authentication, communication network configuration and security authentication, access control, and application storage and management.

Gateway 210 includes a wired communication interface to connect to telephone device 220, using a telephone line (e.g., plain old telephone service (POTS) or integrated services digital network (ISDN)). Gateway 210 provides IP voice and data services between wired phone 220 and telephone network call destinations routed through network 205. Telephone device 210 is capable of operating as a home telephone when connected through gateway 210. Gateway 210 also includes an audio/video communication interface to connect to television display device 230. The audio/video communication interface may be a baseband analog or digital signal interface (e.g., high definition multimedia interface (HDMI)) or may be a radio frequency interface (e.g., coaxial cable). Television display device 230 may be a standalone signal receiving and processing device or may be a display monitor along with a separate input signal processing device and may be capable of receiving one or both of broadcast content or streaming content delivered through gateway 210.

Gateway 210 also includes a wireless interface, implemented using antennas 215, to wireless devices 240a, 240b, and 240c. Gateway 210 is shown having two antennas 215 but in other embodiments, any number of antennas may be used. The wireless interface and antennas 215 on gateway 210 communicate via a radio frequency signal to wireless devices 204a, 204b, and 204c. In one embodiment, wireless device 204a is a tablet, wireless device 204b is a mobile wireless phone, and wireless device 204c is a wireless thermostat. In other embodiments, other devices with wireless interfaces including, but not limited to routers, desktop computers, set top boxes, televisions, storage devices, printers, media players, and home appliances, and lighting may be included.

Wireless devices 240a-c may communicate IP services (e.g., data, voice, video, and/or audio) to and from external network devices connected through gateway 210 via network 205 using signals in one or more of the available protocols and frequencies, as described above. Wireless devices 240a-c may additionally communicate intra-network data between the devices themselves through gateway 210 using antennas 215. The wireless interface included in gateway 210 may accommodate one or more wireless formats or communication protocols including, but not limited to, IEEE 802.11, Wi-Fi Alliance, IEEE 802.15, Zigbee, Bluetooth, Z-wave, Thread, and the like. Further, it is to be appreciated that each of the antennas 215 may be attached to a separate transceiver circuit in gateway 210 or may be used in some combination to form a diversity antenna system. In one embodiment, gateway 210 may include the antennas 215 in an antenna diversity system for use in a WPAN employing the Zigbee protocol. The WPAN may include wireless devices 240a, 240b, and 240c. The WAPN may be configured for intra-device communication allowing a user to control wireless device 240c (e.g., a wireless thermostat) from wireless device 240a (e.g., a tablet). Wireless device 204a and wireless device 204c may also include two transceiver circuits and two antennas, using antenna diversity, while wireless device 204b may include only one transceiver circuit and one antenna. In some embodiments, it may be possible that more than one antenna may be included with, and used by, a single transceiver circuit.

Gateway 210 also includes a wired interface to connect to computer 250, using an Ethernet (e.g., category 5) cable. It is important to note that other devices, such as wireless repeaters, local routers, printers, storage devices, and the like, may be connected together using the wired interface and Ethernet cable.

Figure 3:
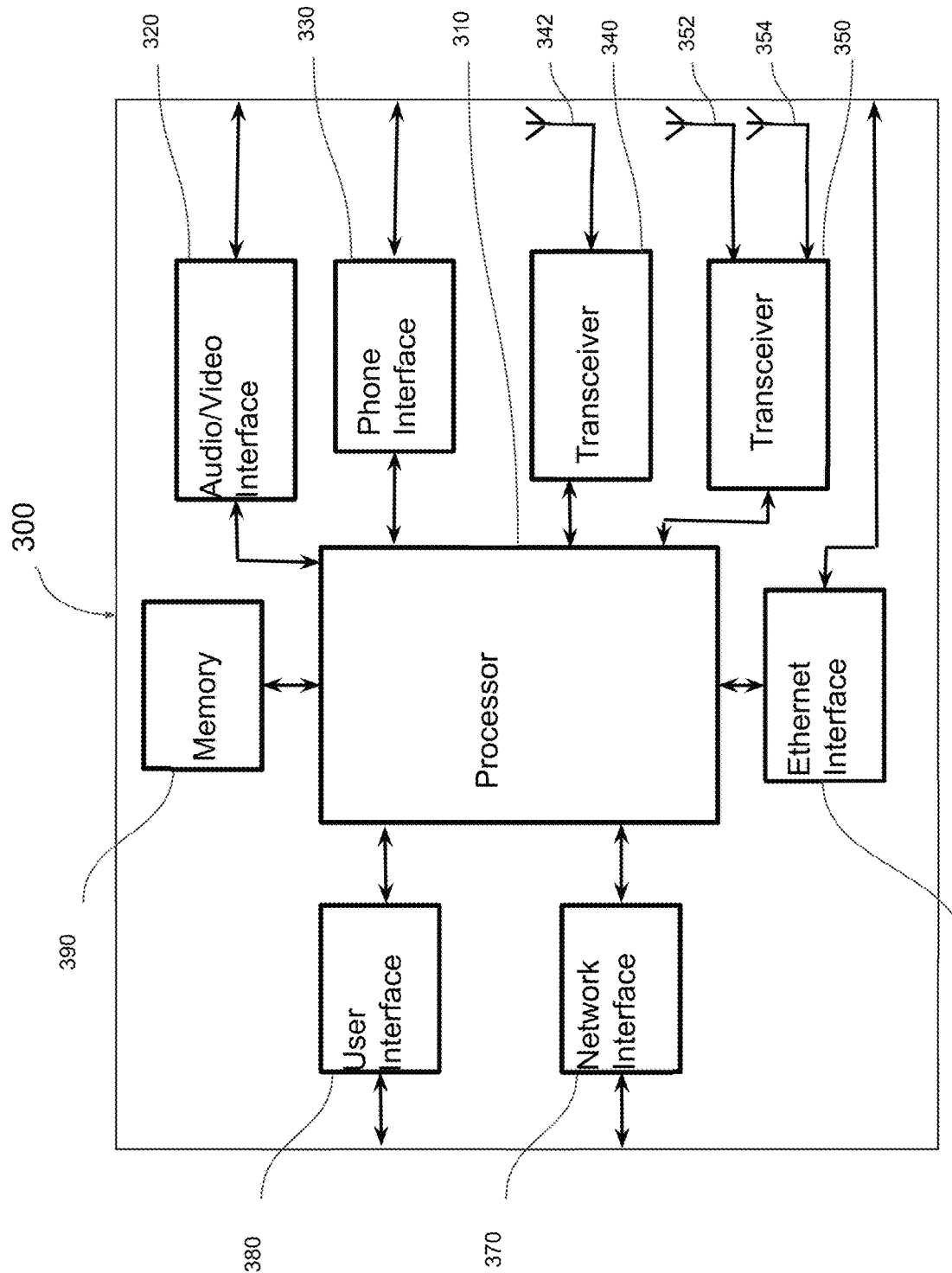
FIG. 3 is a block diagram of an exemplary gateway device to which the principles of the present disclosure are applicable.

Turning to FIG. 3, a block diagram of an exemplary gateway device 300 according to aspects of the present disclosure is shown. Gateway device 300 may operate in a manner similar to gateway 202 described in FIG. 2 or home gateway 101 described in FIG. 1. In gateway device 300, an external network (e.g., WAN link 125 described in FIG. 1) is coupled to network interface 370. Network interface 370 is coupled to processor 310. Processor 310 is coupled to memory 390. Processor 310 is further coupled to audio/video interface 320, phone interface 330, transceiver 340, transceiver 350, and Ethernet interface 360. Transceiver 340 is coupled to antenna 342. Transceiver 350 is coupled to antenna 352 and antenna 354. A user interface 380 is further coupled to processor 310. It is to be appreciated that several components and interconnections necessary for complete operation of gateway device 300 are not shown in the interest of conciseness, as the components not shown are well known to those skilled in the art. Gateway device 300 is capable of operating as an interface to a cable, satellite, microwave, DSL, or fiber optic communication network and is further capable of providing an interface to one or more devices used in a home and connected through either a wired and wireless home network.

Network interface 370 includes circuitry to perform network signal modulation and transmission functions on a signal provided to the external network from gateway 300 as well as signal tuning and demodulation functions on a signal received from the WAN at gateway 300. The RF modulation and demodulation functions, usually included in a transceiver, are the same as those commonly used in communication systems, such as cable or DSL systems. It is important to note that in some embodiments, the network interface 370 may be referred to as a tuner even though the tuner may also include modulation and transmission circuitry and functionality. Processor 310 receives the demodulated network communication signals from network interface 370 and provides any data or content, formatted for network delivery, to network interface 370 for modulation and transmission on the external network. Network interface 370 may also include circuitry for signal conditioning, filtering, and/or signal conversion (e.g., optical to electrical signal conversion). Network interface 370 also includes an interface connector suitable for the type of media that is used for transporting or communicating the signals between gateway 300 and the network. The interface connector may include, but is not limited to, a F-type coaxial connector, a ST type optical connector, a registered jack (RJ) type RJ-11 or RJ-45 connector, a mechanical transfer registered jack (MT-RJ) type connector, and the like.

System memory 390 supports the content and data processing as well as IP functions in processor 310 and also serves as storage for applications, programs, control code and media content and data information. System memory 390 may include one or more of the following storage elements including, but not limited to, RAM, ROM, Electrically-Erasable Programmable ROM (EEPROM), and flash memory. System memory 390 may also encompass one or more integrated memory elements including, but not limited to, magnetic media hard disk drives and optical media disk drives. Digital content and/or data stored in memory 390 may be retrieved by processor 310, processed, and provided to one or more of audio/video interface 320, phone interface 330, transceivers 340 and 350, Ethernet interface 360, network interface 370, and user interface 380. In one embodiment, system memory 390 includes storage locations for signal level values, such as background or threshold signal level values, used as part of selecting an antenna in a diversity antenna system in conjunction with operation of gateway 300.

Audio/video interface 320 allows connection to an audio/video reproduction device, such as a television display device described above or other media device, such as a set top box and the like. Audio/video interface 320 may include additional signal processing circuitry including, but not limited to, digital to analog converters, signal filters, digital and/or analog signal format converters, modulators, demodulators, and the like. Audio/video interface 320 also includes one or more physical connectors to connect to the audio/video reproduction device using one or more of several different types of audio/video connecting cables. The one or more physical connectors may include, but are not limited to, RCA or phone type connectors, HDMI connectors, digital visual interface (DVI) connectors, Sony/Philips digital interface (S/PDIF) connectors, Toshibal Linke (Toslink) connectors, and F-type coaxial connectors.

Phone interface 330 allows connection to an analog telephone handset, such as phone device 220 described in FIG. 2. Phone interface 330 may include additional signal processing circuitry including, but not limited to, digital to analog converters, signal filters, power converters and the like. Phone interface 330 also includes a physical connector to connect a phone wire to the phone, such as a type RJ-11 standard interface connector or other similar standard interface connector.

Ethernet interface 360 allows connection to external devices (e.g., computer 250 described in FIG. 1) that are compliant with the IEEE 802.3 or similar communication protocol. Ethernet interface 360 includes a type RJ-45 physical interface connector or other standard interface connector to allow connection to an external local computer or other Ethernet connected device.

Processor 310 may be a programmable microprocessor that is reconfigurable with downloadable instructions or software code stored in memory 390. Processor 310 may alternatively be a specifically programmed controller and data processor with internal control code for controlling, managing, and processing all functions and data in gateway 300. Processor 310 is also operative to receive and process user input signals provided via user interface 380. User interface 380 may include a user input or entry mechanism, such as a set of buttons, a keyboard, or a microphone. User interface 380 may also include circuitry for converting user input signals into a data communication format to provide to processor 310. User interface 380 may further include some form of user notification mechanism to show device functionality or status, such as indicator lights, a speaker, or a display. User interface 380 may also include circuitry for converting data received from processor 310 to signals that may be used with the user notification mechanism.

Transceiver 340, along with antenna 342, and transceiver 350, along with antennas 352 and 354, provide a wireless communication interface to other devices in a home network (e.g. wireless devices 240a-c described in FIG. 2). Transceiver 340 and transceiver 350 may include various electronic circuits for receiving and transmitting signals to other devices through antenna 342 and antennas 352 and 354 respectively. The various electronic circuits may include, but are not limited to, antenna switches, signal amplifiers, signal meters, frequency converters, modulators, demodulators, and transport processors. Further details regarding the configuration and operation of a transceiver similar to transceiver 340 and transceiver 350 will be described below.

It is important to note that transceiver 340 and transceiver 350 may operate using two different communication protocols. In some embodiments, transceiver 340 communicates signals with other wireless devices through antenna 342 using an IEEE 802.11 protocol. Transceiver 350 additionally communicates signals with other wireless devices through antennas 352 and 354 using the Zigbee protocol. Further, transceiver 350 is configured to operate antenna 352 and antenna 354 using switching antenna diversity. It is important to note that in other embodiments transceiver 340 and transceiver 350 may be configured to operate using other wireless communication protocols, such as Thread, Bluetooth, Z-Wave, and Wi-Fi.

As described above, Zigbee is a low-power, low data rate, and close proximity (i.e., personal area) wireless ad hoc or mesh network (e.g., WPAN) based on the IEEE 802.15.4 standard. Applications include wireless light switches, home energy monitors, traffic management systems, and other consumer and industrial equipment that require short-range low-rate wireless data transfer. The specification includes protocols for the network layer, as well as the application layer and further defines specific Zigbee Device Objects (ZDOs) as part of the control and management software as well as manufacturer-defined application objects. ZDOs are responsible for some tasks, including keeping track of device roles and managing requests to join a network, as well as device discovery and security.

Zigbee further specifies operation in the unlicensed 2.4 to 2.4835 GHz band as well as the 902 to 928 MHz band in the Americas and Australia and 868 to 868.6 MHz ISM band in Europe. Sixteen channels are allocated in the 2.4 GHz band, with each channel occupying two MHz bandwidth while being spaced five MHz apart. The physical layer communication uses direct-sequence spread spectrum coding, which is managed by the digital stream provided to the modulator in the transceiver (e.g., transceiver 350). Binary phase-shift keying (BPSK) is used in the 868 MHz and 915 MHz range bands, while offset quadrature phase-shift keying (OQPSK) that transmits two bits per symbol is used in the 2.4 GHz band. The maximum over-the-air data rate is 250 kbit/s per channel in the 2.4 GHz band, 40 kbit/s per channel in the 915 MHz band, and 20 kbit/s in the 868 MHz band. The actual data throughput will be less than the maximum specified bit rate due to the packet overhead and processing delays. For indoor applications at 2.4 GHz, the expected transmission distance may be 10 to 20 meters, depending on the construction materials, the number of walls to be penetrated, and the output power permitted in that geographical location. Outdoors with line-of-sight, range may extend up to 1500 meters depending on power output and environmental characteristics. The output power of the radios is generally between 0 and 20 decibels above one milliwatt (dBm) or 1 and 100 milliwatts (mW).

Zigbee devices may operate in three different modes. A Zigbee Coordinator is the most capable device and operates as an entry device into the PAN with capabilities of bridging to other networks. Only one device may be a Zigbee Coordinator in each network since it is the device that stores information about the network, including acting as the trust center & repository for any security keys as well as running applications. A Zigbee Router operates as an intermediate router, passing on data from other devices as well as running application functions. A Zigbee End Device operates only a functional device capable of carrying out a defined set of tasks and communicating with a parent node or device (either Zigbee Coordinator or a Zigbee Router). The limited capability allows the Zigbee End Device or node to be low power or standby mode of operation for a significant amount of time providing long battery life. Gateway 300 may be classified as a Zigbee coordinator while the wireless devices connected to gateway 300 through the wireless network (e.g., devices 240a, 240b, and 240c) may be classified as Zigbee routers or Zigbee End devices.

A network that is operating using Zigbee protocols may utilize beacon or non-beacon based communications. Non-beacon based communications uses an unslotted channel access mechanism typically requiring Zigbee Coordinator and Zigbee Routers to operate receiver circuitry continuously, increasing power consumption. Non-beacon communications allow for heterogeneous networks in which some devices receive continuously, while others only transmit when an external stimulus is detected. In beacon-enabled networks, the special network nodes called Zigbee Routers transmit periodic beacons to confirm their presence to other network nodes. Nodes may sleep between beacons, thus lowering their duty cycle and extending their battery life. Beacon intervals depend on data rate and may generally range from 15.36 milliseconds to 251.65824 seconds at 250 kilobit per second.

The basic channel access mode is "carrier sense, multiple access/collision avoidance" (CSMA/CA). That is, the nodes talk in the same way that humans converse; they briefly check to see that no one is talking before he or she starts, with three notable exceptions. Beacons are sent on a fixed timing schedule and do not use CSMA. Message acknowledgments also do not use CSMA. Finally, devices in beacon-enabled networks that have low latency real-time requirements may also use Guaranteed Time Slots (GTS), which by definition do not use CSMA.

Each media access control (MAC) frame of data in the Zigbee signalling protocol includes a preamble synchronization header (SHR), which is typically 4 bytes, a physical header (PHR), which is typically one byte, and a data payload or Physical Service Data Unit (PSDU), which is variable but typically ranges from zero (0) to 255 bytes. The SHR is inherently redundant for the purposes of reception and provides the opportunity to implement an antenna selection algorithm as part of an antenna diversity system.

As part of using switching diversity during operation, transceiver 350 may select an antenna for reception of a signal containing frames of data complying with the Zigbee protocol that is transmitted from a wireless device (e.g., wireless devices 240a-c described in FIG. 2). Processor 310 may be configured to determine a first difference value for the signal received at antenna 352. The first difference value is the difference between the signal level for the signal received at antenna 352 and a signal threshold value associated with antenna 352. The determination or measurement of the received signal received at antenna 352 is performed during a first time period of the initial portion of the frame of data, such as during the first byte of the SHR as described above. Processor 310 may additionally be configured to determine a second difference value for the signal received at antenna 354 during a second time period of the initial portion of the frame of data, such as during the second byte of the SHR as described above. The second difference value is determined in a similar manner to the determination of the first difference value. Processor 310 may provide instructions to transceiver 350 to alternately couple the receiver circuit in transceiver 350 between antenna 352 and antenna 354 during an initial signal search or signal detection phase as well as control the coupling of antenna 352 during the first time period and the coupling of antenna 354 during the second or subsequent time period. The threshold level associated with antenna 352 and the threshold level associated with antenna 354 may be retrieved from system memory 390 as needed for the determinations described above.

Processor 310 may further be configured to provide instructions to transceiver 350 to couple the receiving circuit to antenna 352 for a remaining portion of the frame of data (e.g., the PSDU) if the first difference level, the difference level for antenna 352 is greater than the second difference level, the level for antenna 354. It is important to note that the time period used for antenna selection should be limited to the preamble of the frame of data and, more particularly to the first two to three bytes of the SHR, in order to minimize impact on reception of the remaining portion of the frame of data or PSDU. In one embodiment, transceiver 350 switches between antenna 352 and antenna 354 as part of determining signal levels in 40 microseconds or less time.

The threshold levels associated with antennas 352 and 354 may be determined as part of a calibration procedure at initialization of gateway 300 or may be determined during operation. In one embodiment, the threshold value associated with antenna 352 is determined by measuring a signal level present at antenna 352, while coupled to the receiving circuit of transceiver 350, during a time period when only background or nominal noise and/or interference signal levels are being received. In other words, the signal present at antenna 352, represents a background signal level and does not include signal energy from a signal transmitted by a wireless device (e.g., wireless devices 240a-c) on the wireless network signal, such as a signal intended for reception by gateway 300. Similarly, the threshold value associated with antenna 354 is determined by measuring a signal level present at antenna 354, while coupled to the receiving circuit of transceiver 350, during a time period when only background or nominal noise and/or interference signal levels are being received. In some embodiments, the time period for measuring the threshold value associated with antenna 352 and the time period for measuring the threshold value associated with antenna 354 may be different. The threshold values may be stored in memory 390. The threshold values may additionally be updated periodically during operation.

To illustrate the importance of determining separate threshold values for antenna 352 and antenna 354 and using these separate threshold values as part of the antenna selection mechanism, consider the following example. If the threshold value for Antenna 352 is 3 dB higher than the threshold value for antenna 354, then antenna 352 should only be selected for the remaining portion of the received signal when the received signal measured at antenna 352 approximately 3 dB greater than the received signal measured on Antenna 354. In other words, the 3 dB additional noise on antenna 352 means that until the received signal is approximately 3 dB higher on antenna 352, making the difference between the received signal and the threshold value for antenna 352 greater than the difference between the received signal and the threshold value for antenna 354.

It is important to note that transceiver 350 may continuously switch between coupling the receiving circuit in transceiver 350 to antenna 352 and antenna 354 while determining whether a received signal strength at the antenna currently coupled to transceiver 350 exceeds a threshold signal value as part of detection the presence of a signal transmitted by another wireless device. Once, the received signal at one of antenna 352 and antenna 354 exceeds the threshold value associated with that antenna, that antenna is used to initiate the antenna selection as described above. It is possible that only one of the two antennas 352 and 354 receive a signal having a signal level that exceeds its associated threshold value. In this case, the antenna is selected for the remaining portion of the frame of date. If both antennas 352 and 354 receive a signal level that exceeds threshold value associated with each of the antennas, then the antenna with the greater difference between the received signal and the threshold value associated with that antenna is used for the remaining portion of the frame of data. After receipt of the frame of data is complete, processor 310 instructs transceiver 350 to initiate continuously switching between coupling the receiver circuit to antenna 352 and coupling the receiver circuit to antenna 354 as part of searching for or detecting the presence of a signal transmitted by a wireless device, as described above, or until the receive state is terminated (e.g., to begin transmitting a signal).

Figure 4:
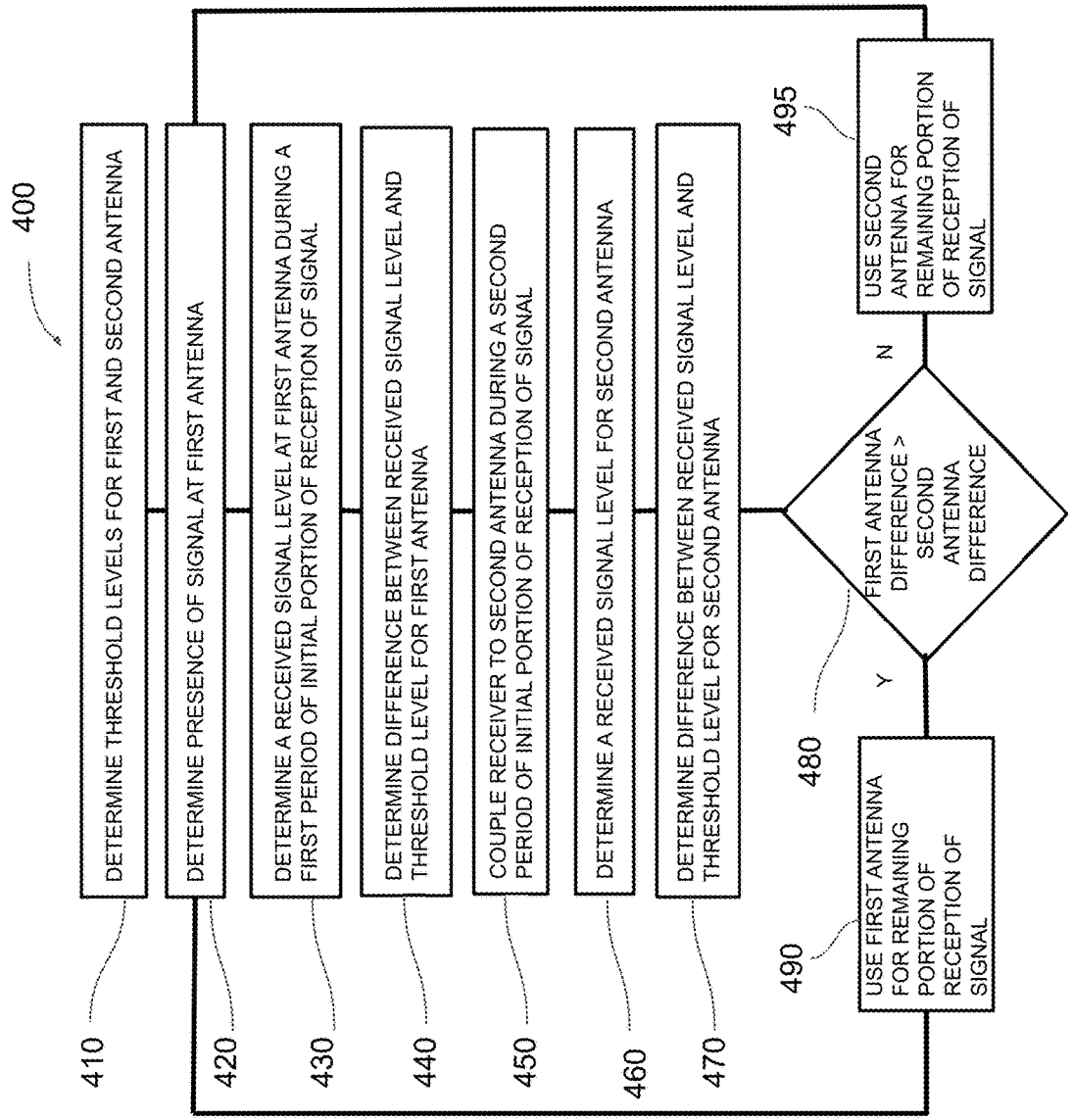
FIG. 4 is a flow chart of an exemplary process for selecting an antenna in a diversity antenna system used in a device to which the principles of the present disclosure are applicable.

Turning to FIG. 4, a flow chart of an exemplary process 400 for selecting an antenna in a diversity antenna system used in device according to aspects of the present disclosure is shown. Process 400 is primarily described with respect to a gateway device, such as gateway 210 described in FIG. 2 or gateway 300 described in FIG. 3. Process 400 may also be performed by any device that operates similar to a gateway, such as home gateway 101 described in FIG. 1. Although process 400 depicts steps performed in a particular order for purposes of illustration and discussion, the operations discussed herein are not limited to any particular order or arrangement. Further, while process 400 is described in association with a diversity antenna system employing two antennas, process 400 may easily be adapted for use in diversity antenna systems using more than two antennas. One skilled in the art, using the disclosure provided herein, will also appreciate that one or more of the steps of process 400 may be omitted, rearranged, combined, and/or adapted in various ways.

At step 410, the threshold signal levels for a first antenna and a second antenna are determined. As described above, the threshold signal levels represent a signal level present at each antenna (e.g., antennas 352 and 354) while only background or nominal noise and/or interference signal levels are received. The threshold signal may be determined or measured during a time period that a desired signal (e.g., transmission of a signal compliant with the Zigbee wireless protocol) is not present or being transmitted by other wireless devices (e.g., wireless devices 240a-c) in the network. In some embodiments, the threshold levels, at step 410, may be determined and adjusted or updated on a periodic basis during the time periods when the desired signal is not present. In some other embodiments, the threshold levels may be determined, at step 410, as part of an initialization procedure for the device (e.g., gateway 200 or gateway 300). In still other embodiments, the threshold levels may be determined based on empirical calculations and/or measurements during the design phase of the device. Additionally, at step 410, the threshold levels for the first antenna and second antenna are stored in a memory (e.g., memory 390).

It is important to note that separate threshold levels are determined and stored for the first antenna and second antenna. As a result, the threshold level for the first antenna may be different from the threshold level for the second antenna. As described above, the placement limitation of antennas that are integral to an electronic device may result in each of the antennas being immersed in different operating environments that have different background noise and interference signal levels. The determination and storage of separate threshold levels for each antenna as part of the selection of an antenna in a diversity antenna system provides compensation for the limitations associated with antenna placement and positioning in electronic devices.

At step 420, the presence of a received signal is determined or measured at a first antenna. The received signal may be a signal transmitted by a wireless device (e.g., one of wireless device 240a-c) and may include data that is intended for use or processing in or by the device (e.g., gateway 300). In some embodiments, the first antenna is the default antenna that is always used for determining the presence of a received signal (e.g., antenna 352 described in FIG. 3). In some other embodiments, a controller (e.g. controller 310) periodically switches the connection or coupling of transceiver (e.g., transceiver 350) between the two antennas (e.g., antenna 352 and antenna 354). The time period for switching between the two antennas may typically be less than a time period of an initial portion or preamble of a frame of data in the signal in order to try and make sure that at least one of the two antennas may initially detect the presence of the signal that has been transmitted. It is important to note for exemplary purposes, process 400 is described as having the first antenna (e.g., antenna 352) initially determine the presence of a received signal. However, process 400 may equally be described as having the second antenna (e.g., antenna 354) initially determine the presence of a received signal.

At step 430, the signal level of the signal received at the first antenna (e.g., antenna 352) is determined. The signal level may be determined in a signal level detector or power meter included in the receiver circuit of a transceiver (e.g. transceiver 350) or may be included as part of electronic circuitry in the antenna. The signal level is determined during a first time period of the initial portion of the preamble of the frame of data in the signal. In one embodiment, the first time period representing a time period of less than one byte used for the SHR of a frame of data compliant with the Zigbee protocol.

At step 440 a value for the difference between the signal level of the signal received at the first antenna (e.g., antenna 352) and the threshold level for the first antenna, as determined and stored at step 410, is determined or calculated. The value for the difference is determined or calculated by taking the value for signal level determined, at step 430, and subtracting the threshold value, determined at step 410. The values (e.g., signal level and threshold level) used for the determination, at step 440, may be in decibel units, after conversion from power units (e.g., milliwatts) as needed in order to facilitate the subtraction. The value for the difference may be determined or calculated in the transceiver (e.g., transceiver 350) or may be determined or calculated in a separate processor included in the device (e.g., processor 310 in gateway 300). Also, at step 440, after the value for the difference is determined or calculated, the value may be stored in a memory (e.g., memory 390).

At step 450, the control circuit in the transceiver (e.g., transceiver 350) couples the receiver circuit to the second antenna (e.g., antenna 354) and decouples the receiver circuit from the first antenna (e.g., antenna 352). The coupling to the second antenna, at step 450, may be done during the time period the signal level received at the first antenna is determined, at step 430. Alternatively, the coupling to the second antenna, at step 450, may be done after the time period the signal received at the first antenna is determined, at step 430, but before or at the same time as the determination of the difference between the received signal level and the threshold level for the first antenna, at step 440.

At step 460, the signal level of the signal received at the second antenna (e.g., antenna 354) is determined. As described above, the signal level may be determined in a signal level detector or power meter included in the receiver circuit of a transceiver (e.g. transceiver 350) or may be included as part of electronic circuitry in the antenna. The signal level is determined during a second time period of the initial portion of the preamble of the frame of data in the signal. It is important to note that the first time period, at step 430, and the second time period, at step 440 may occur consecutively or may partially or completely overlap. In one embodiment, the second time period represents a time period of less than one byte used for the SHR of a frame of data compliant with the Zigbee protocol and occurs during a different byte used for the SHR than the first time period, at step 430.

At step 470, a value for the difference between the signal level of the signal received at the second antenna (e.g., antenna 354) and the threshold level stored for the second antenna, as determined and stored at step 410, is determined or calculated. As described above, at step 440, the value for the difference may be determined or calculated by subtracting the signal level determined, at step 460, from the threshold level stored for the second antenna, at step 410. The value for the difference may also be determined in the transceiver (e.g., transceiver 350) or may be determined or calculated in a processor included in the device (e.g., processor 310 in gateway 300). Also, at step 470, after the value for the difference is determined or calculated, the value is stored in a memory, such as memory 390.

At step 480, a comparison is made between the value for the difference determined for the first antenna (e.g., antenna 352) and the value for the difference determined for the second antenna (e.g., antenna 354). The comparison, at step 480, may be performed in a transceiver (e.g., transceiver 350) or in a processor in the device (e.g., processor 310 in gateway 300). As described above, the use of separate threshold levels for each of the antennas is beneficial for implementations that include limitations to the locations for the antennas, such as in small electronic devices or electronic devices with integrated antennas. The separate threshold levels allow for each antenna threshold level to be weighted or adjusted to account for the presence of different noise and/or interference signal levels for each of the antennas.

If, at step 480, the value for the difference determined for the first antenna (e.g., antenna 352) is greater than the value for the different determined for the second antenna (e.g., antenna 354), then, at step 490, the first antenna is coupled to the receiver circuit of the transceiver (e.g., transceiver 350) and used for the reception of the remaining portion of the frame of data included in the signal. The coupling of the first antenna may be controlled by the transceiver or may be initiated by a processor in the device (e.g., processor 310 in gateway 300), through instructions provided to the transceiver.

If, at step 480, the value for the difference determined for the first antenna (e.g., antenna 352) is not greater than the value for the different determined for the second antenna (e.g., antenna 354), then, at step 495, the second antenna is coupled to the receiver circuit of the transceiver (e.g., transceiver 350) and used for the reception of the remaining portion of the frame of data in the signal. As above, the coupling may be controlled by the transceiver or by a processor in the device (e.g., processor 310 in gateway 300). It is important to note that when the value for the difference determined for the first antenna is equal to the value for the difference determined for the second antenna, then either antenna is likely to provide the same reception performance and either antenna may be used for receiving the signal. As described in process 400, the second antenna is used for receiving signal, as described at step 495, in order to preserve time and eliminate an unnecessary switching from the second antenna to the first antenna during the time period for reception of the signal. In some embodiments, when the value for the difference determined for the first antenna is equal to the value for the difference determined for the second antenna the first antenna may be used for reception of the signal, as described at 490, based on design or other considerations.

After the time period for receiving the frame of data in the signal is complete at either step 490 or step 495, process 400 returns to step 420 to determine the presence of a signal, including a frame of data, being transmitted by one of the wireless devices in the network (e.g., wireless devices 240a-c). It is important to note that in some embodiments the determination of threshold levels, at step 410, may continue periodically as part of the operation of the device and as part of process 400. The determination, at step 410 may be performed during time periods when no signal is being transmitted by the wireless devices and no signals, other than noise and interference, are present at the antennas (e.g., antennas 352 and 354). The resulting threshold levels, determined each time at step 410, may be stored and used as current or updated threshold levels for each of the antennas.

Figure 5:
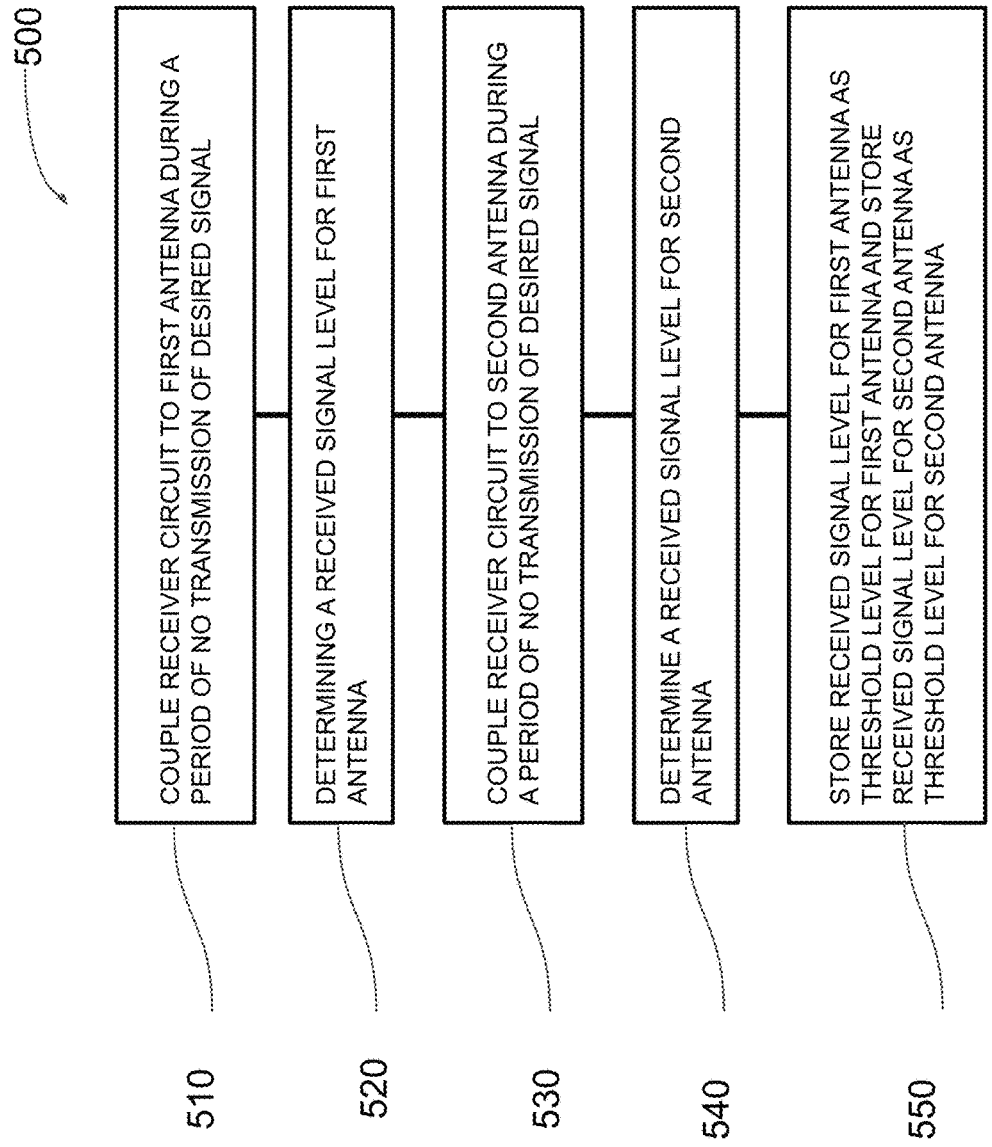
FIG. 5 is a flow chart of an exemplary process for determining threshold signal level values for each antenna in a diversity antenna system used in a device to which the principles of the present disclosure are applicable.

Turning to FIG. 5, a flow chart of an exemplary process 500 for determining threshold values for each antenna in a diversity antenna system used in device according to aspects of the present disclosure is shown. Process 500 may be used as part of determining the threshold values of a first antenna and a second antenna as it is described at step 410 of process 400 in FIG. 4. Process 500 is primarily described with respect to a gateway device, such as gateway 210 described in FIG. 2 or gateway 300 described in FIG. 3. Process 500 may also be performed by any device that operates similar to a gateway, such as home gateway 101 described in FIG. 1. Although process 500 depicts steps performed in a particular order for purposes of illustration and discussion, the operations discussed herein are not limited to any particular order or arrangement. Further, while process 500 is described in association with a diversity antenna system employing two antennas, process 500 may easily be adapted for use in diversity antenna systems using more than two antennas. One skilled in the art, using the disclosure provided herein, will also appreciate that one or more of the steps of process 500 may be omitted, rearranged, combined, and/or adapted in various ways.

Process 500 may be implemented during a time period when no transmission of signals from other devices occurs. The device (e.g., gateway 300) may initiate process 500 as part of the initial set up for the device. Alternatively, the device may transmit a message to all wireless devices using the communication protocol to cease transmission for a period of time as part of initiating process 500. In some embodiments, process 500 may also be used to periodically update the threshold values for the first and second antenna (e.g., antenna 352 and antenna 354) during operation of the device. The timing of the periodic update may be fixed, such as once a week during the early morning hours, or may be variable. In these embodiments, the processor (e.g., processor 310) may monitor signal transmission and reception activity in the network to determine time period when no transmission from other devices will occur.

At step 510, the receiver circuit in the transceiver (e.g., transceiver 350) is coupled to the first antenna (e.g., antenna 352). The processor in the device (e.g., processor 310 in gateway 300) may provide instructions for controlling the antenna switch in the transceiver. Alternatively, a controller in the transceiver may include code for performing the steps of the process 500 including controlling the antenna switch. As described above, the coupling of the receiver circuit in the transceiver (e.g., transceiver 350) to the first antenna or the second antenna (e.g., antenna 354) may be mutually exclusive as part of the antenna diversity system. At step 520, the signal level of the signal received at the first antenna is determined. The signal level may be determined in a signal level detector or power meter included in the transceiver or may be included as part of electronic circuitry in the antenna. The measurement of the signal may include making several measurements over a period of time and determining an average signal level or a peak signal over the period of time in order to account for periodic noise or interference signal energy. In one embodiment, a series of ten signal level measurements are made over a period of 20 milliseconds and the highest signal level is used for the received signal level value.

At step 530, the receiver circuit in the transceiver (e.g., transceiver 350) is coupled to the second antenna (e.g., antenna 354) and decouples the receiver from the first antenna. As in step 510, the processor in the gateway or the controller in the transceiver may control the antenna switch. It is important to note that the coupling to the second antenna may be performed during or after completion of the measurements, at step 520. At step 540, the signal level of the signal received at the second antenna is determined. As in step 520, the signal level may be determined in a signal level detector or power meter or may be included as part of electronic circuitry in the antenna. Also, the measurement of the signal level may include making several measurements over a period of time and used to determine the received signal level value.

At step 550, the value for the received signal level measured or determined for the first antenna (e.g., antenna 352), at step 520, and the value for the received signal level measured or determined for the second antenna (e.g., antenna 354), at step 540, are stored in memory (e.g., memory 390). These values may be retrieved and used as the threshold values for the first antenna and second antenna, respectively, such as at steps 440 and 470 in process 400.

Figure 6:
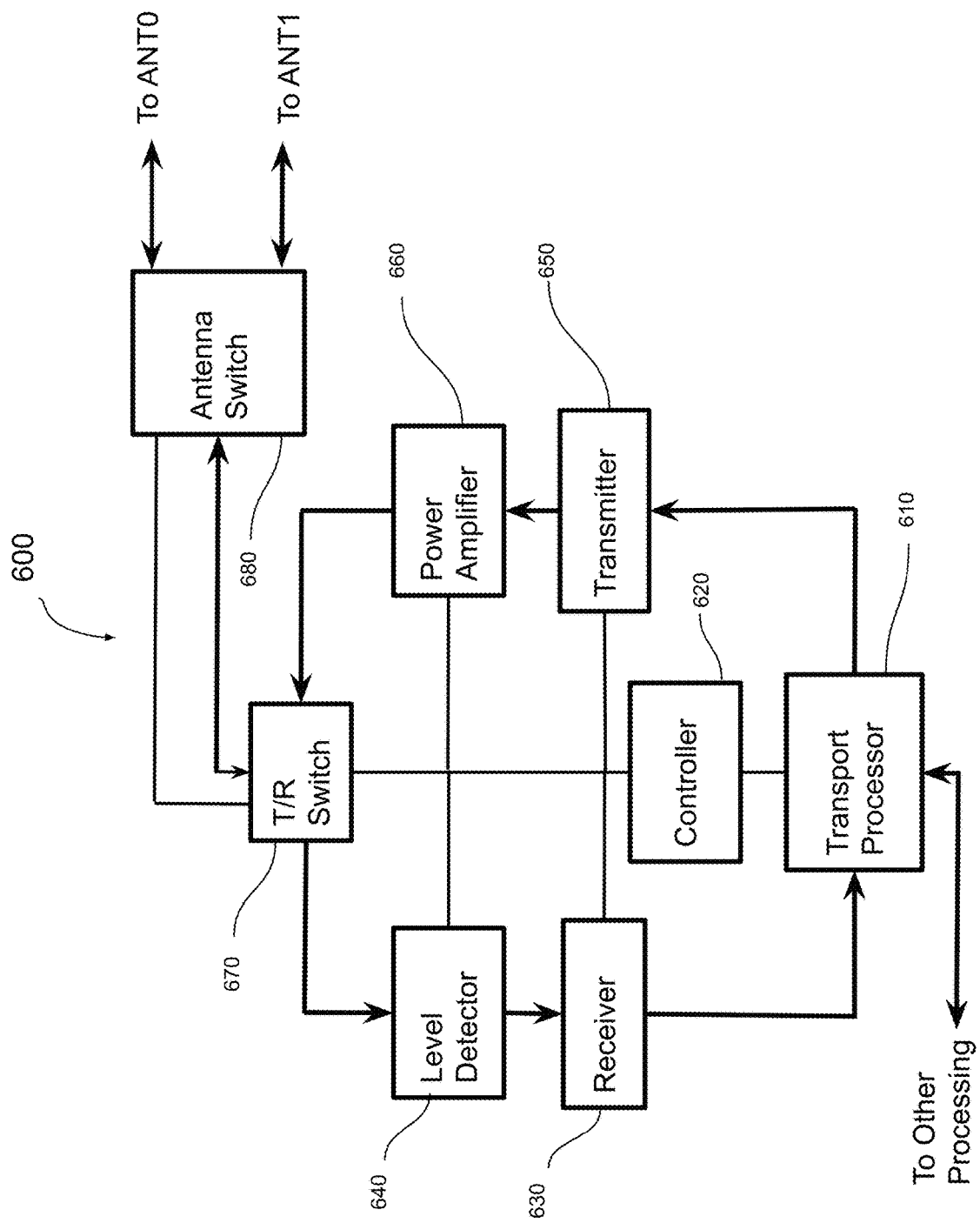
FIG. 6 is a block diagram of an exemplary transceiver circuit used in an electronic device as part of selecting an antenna in a diversity antenna system to which the principles of the present disclosure are applicable.

Turning to FIG. 6, an exemplary transceiver circuit 600 used as part of selecting an antenna in a diversity antenna system according to aspects of the present disclosure is shown. Transceiver circuit 600 operates in a manner similar to transceiver circuit 350 described in FIG. 3 and may be incorporated as a component or circuit into an electronic or wireless networking device, such as gateway 300 described in FIG. 3, gateway 210 described in FIG. 2, or home gateway 101 described in FIG. 1. In transceiver circuit 600, signals are interfaced from other processing circuits in the device through transport processor 610. Transport processor 610 is coupled to receiver 630 and transmitter 650. Receiver 630 is further coupled to level detector 640. Transmitter 650 is further coupled to power amplifier 660. Both level detector 640 and power amplifier 660 are coupled to transmit/receive (T/R) switch 670. T/R switch 670 is coupled to antenna switch 680. Antenna switch 680 includes interfaces to couple to both a first antenna, labelled ANT0, and a second antenna, labelled ANT1. A controller 620 couples to transport processor 610, receiver 630, level detector 640, transmitter 650, power amplifier 660, and T/R switch 670. A separate control coupling is shown between T/R switch 670 and antenna switch 680.

Transceiver 600 is capable of transmitting wireless signals to other wireless devices in a transmit mode operation. The transmitted wireless signal includes data in the electronic device as well as data provided from other wireless devices in the network (e.g., devices 240a-c described in FIG. 2) or from devices on the WAN (e.g., service provider 110 described in FIG. 1). Transceiver 600 is also capable of receiving wireless signals from other wireless devices in a receive mode of operation. The received wireless signal includes data for use in the electronic device as well as data to be provided to other wireless devices or to devices on the WAN. In the transmit mode of operation, transport processor 610 receives packetized data from other processing circuits (e.g., processor 310 described in FIG. 3). Transport processor 610 includes processing elements for reformatting the data for transmission over the wireless communication channel. The reformatting may include, but is not limited to, error correction encoding, symbol formatting, transform processing, symbol timing, and transmission packet generation. The transport formatted signal from transport processor 610 is provided to transmitter 650. Transmitter 650 transforms the formatted signal into a radio frequency modulated signal for transmission at the desired wireless frequency range (e.g., 2.4 GHz). Transmitter 650 includes a final symbol mapper as well as a signal modulator. Transmitter 650 may also include analog and/or digital filters for limiting frequency range of the signal energy in the radio frequency modulated signal prior to transmission as well as an upconverter for changing the frequency range of the signal from the baseband range to desired radio frequency range.

The filtered radio frequency signal from transmitter 650 is provided to power amplifier 660. Power amplifier 660 amplifies the filtered radio frequency signal to a level suitable for wireless signal transmission based on the wireless transmission standard used. The amplified radio frequency signal from power amplifier 660 is provided to T/R switch 670, which passes the signal through to antenna switch 680 when the transmit position or switch setting is selected. Antenna switch 680 further passes the amplified radio frequency signal through to either ANT0 or ANT1 for transmission over the wireless medium, depending on the setting of the antenna switch position.

In the receive mode of operation, a wireless radio frequency signal is received at antenna switch 680 through the interface for ANT0 or the interface for ANT1. The wireless radio frequency signal from one of these two interfaces is selected based on the switch setting on antenna switch 680 and passed through to T/R switch 670 depending on the switch position. The wireless radio frequency signal is further passed through T/R switch 670, when the receive position or switch setting is selected, to level detector 640. Level detector 640 processes the wireless radio frequency signal provided from T/R switch 670 to determine the signal or energy level of the received radio frequency signal. The signal or energy level includes energy or power associated with any signal transmitted by another wireless device (e.g., wireless devices 240a pc described in FIG. 2) as well as the background noise and interference energy or power that may be present and received at either the interface for ANT0 or the interface for ANT1. It is important to note that only signal energy or power associated with background noise or interference signal levels will be present during time periods when no wireless devices are transmitting signals.

Level detector 640 may include a power or energy sampling circuit to determine signal level without significantly altering or disturbing the received wireless radio frequency signal or significantly reducing or dissipating any power or energy from the signal. Examples of energy sampling circuits include, but are not limited to, electromagnetic coupling circuits, electrostatic coupling circuits, high impedance coupling circuits, and power bridging circuits. Level detector 640 may also include filters, amplifiers, and other processing circuits to convert the sampled energy from the received signal into a format representing a signal value that may be used in other processing circuits (e.g., threshold signal level values and received signal level values for antenna selection).

After processing in level detector 640 to determine signal level, the wireless radio frequency signal is provided to receiver 630. Receiver 630 transforms the received radio frequency signal into a transport formatted data signal. Receiver 630 includes a demodulator as well as a symbol demapper. Receiver 630 may also include downconverter circuits for shifting the frequency of the received signal to a baseband frequency range along with analog and/or digital filters for removing unwanted signal power or energy outside of the desired signal frequency range or bandwidth. The transport formatted data signal from receiver 630 is provided to transport processor 610. Transport processor 610 includes processing elements for converting the transport formatted data signal into a packetized data signal that can be provided over an internal communication bus to other components in the device (e.g., processor 310 in gateway 300 described in FIG. 3) for further processing and use. The reformatting in transport processor 610 may include, but is not limited to, error correction decoding, symbol deformating, transform processing, data bit timing recovery, and data packet formation.

Controller 620 provides control information and data processing capabilities for the various blocks within transceiver 600. Controller 620 may provide switch control information for T/R switch 670 to control the switch position for either transmitting or receiving wireless signals through the antennas during transmit mode or receive mode of operation respectively. Controller 620 may also provide instructions to antenna switch 680 to control the switch position for coupling either ANT0 or ANT1 through the T/R switch 670 to either level detector 640 or power amplifier 660. Controller 620 may also include instructions or software code to implement an antenna selection process as part of the diversity antenna system. More specifically, controller 620 may include code to retrieve signal level measurements from level detector 640 and determine a value for a difference in signal level for a signal received at ANT0 when coupled to level detector 640 and the threshold signal level associated with ANT0 during a first time period of an initial portion of the transmission of a frame of data as part of the received signal as well as determine a value for a difference in signal level for a signal received at ANT1 when coupled to level detector 640 and a threshold signal level associated with ANT1 during a subsequent time period of the initial portion of the transmission of the frame of data as part of the received signal. Controller 620 may further provide a control signal to antenna switch 680 to couple the selected one of the two antennas (e.g., ANT0 and ANT1) to level detector 640 for a remaining portion of the transmission of the frame of data as part of the received signal depending on the determined value in signal levels for ANT0 and ANT1.

Controller 620 may also provide values for signal levels determined using level detector 640 to transport processor 610. Controller 620 may provide values as part of a process for determining threshold values for each antenna, such as process 500 described in FIG. 5, and values for signal levels determined as part of a process for selecting an antenna in a diversity antenna system, such as process 400 described in FIG. 4. Transport processor 610 reformats the values received from controller 620 and provides the values as data packets to other processing circuits in the device. It is important to note that in some embodiments, controller 620 may be functionally or operationally limited in some manner. In these embodiments, controller 620 may receive instructions through transport processor 610 from a processor within the device (e.g., processor 310 in gateway 300 described in FIG. 3) for performing, managing, or controlling any of the functions associated with the operation of transceiver 600, including those functions described above.

Figure 7:
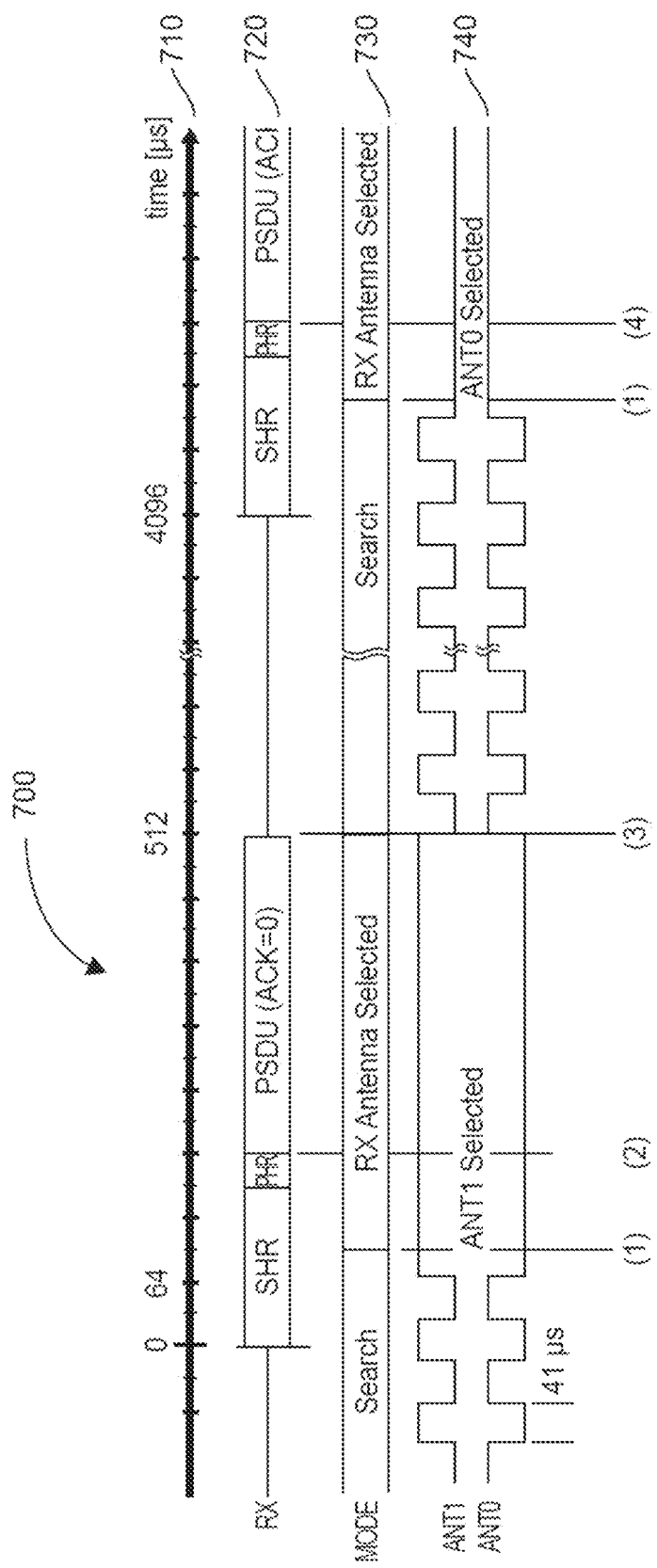
FIG. 7 is an exemplary timing diagram associated with the timing, control, and selection of an antenna in a diversity antenna system to which the principles of the present disclosure are applicable.

FIG. 7 shows an exemplary timing diagram 700 associated with the timing, control, and selection of an antenna in a diversity antenna system according to aspects of the present disclosure. Timing diagram 700 illustrates operational aspects of antenna selection as described above for process 400 described in FIG. 4. Timing diagram 700 describes the timing, control, and selection relationships associated with frames of data transmitted in a signal that complies with the Zigbee protocol and IEEE 802.15.4. It is important to note that timing diagrams associated with frames of data in signals complying with different protocols, such as Z-wave, Bluetooth, and Thread, may include different timing, control, and selection relationships than those shown in timing diagram 700. One skilled in the art should be able to adapt any of the embodiments in the present disclosure, such as process 400 described in FIG. 4, to any of these different timing diagrams based on the basic characteristics described for timing diagram 700.

Timing diagram 700 includes a time scale 700, shown in microseconds (μs). Element 720 illustrates two received frames of data (e.g. receiver 630 in FIG. 6). The first frame is received at time zero (0) us and ends at 512 μs. The second frame is received at time 4,096 μs and is not shown ending. Each frame contains the SHR, the PHR and the PSDU as described above.

Element 730 shows the operating mode for the diversity selection. During time periods between received frames, operating mode is labelled Search. The operating mode also remains in Search during the initial or SHR portion of the received packet. During most of the reception time for the packet, the operating mode is labelled RX Antenna Selected. Element 740 shows the control or switch state for antenna 0, labelled ANT0, and antenna 1, labelled ANT1. A high state indicates coupling of that antenna to the receiving circuit. During search mode, the antennas alternate being coupled to the receiver for 41 µs, a time period shorter than one symbol in the SHR portion of the packet. As illustrated by element 740, antenna selection begins during coupling of Antenna1 to the receiver with the first byte of the SHR in the first frame of data. The transceiver switches to ANT0 after approximately one byte of the SHR. ANT1 is selected for receiving the remainder of the first frame of data based on the antenna selection algorithm. For the second frame of data, antenna selection begins during coupling of ANT1 to the receiver with the first byte of the SHR. The transceiver switches to ANT1 after approximately one byte of the SHR. ANT0 is selected for receiving the remainder of the second frame of data based on the antenna selection algorithm.

One or more embodiments of the present disclosure provide a mechanism for selecting an antenna as part of a diversity antenna system used as part of an electronic device such as a gateway. The mechanism provides advantages to diversity antenna systems that include antennas that may have restriction to antenna placement and systems that include antennas that may be located in environments with differing noise and/or interference energy levels due to proximity to metallic structures and noise generating electronic circuits. The mechanism is particularly advantageous for use in small electronic devices that integrate the antennas used with the diversity antenna system within the interior space of the mechanical structure for the device.

According to the present disclosure, a method is described that includes receiving a first portion of a signal using a first antenna during a first time period and using a second antenna during a second time period The method additional includes determining a first difference value for the first portion of the signal received by the first antenna, the first difference value being a difference between a signal level for the first portion of the signal received by the first antenna and a threshold signal level associated with the first antenna and determining a second difference value for the first portion of the signal received by the second antenna, the second difference value being a difference between a signal level for the first portion of the signal received by the second antenna and a threshold signal level associated with the second antenna. The method further includes receiving a second portion of the signal using the first antenna if the first difference value is greater than the second difference value.

In some embodiments, the threshold value associated with the first antenna and the threshold value associated with the second antenna are determined by measuring a first background signal level using the first antenna and measuring a second background signal level using the second antenna during a third time period when the signal is not transmitted. Further, in some embodiments, the threshold value associated with the first antenna and the threshold value associated with the second antenna are updated periodically.

According to the present disclosure, a networking apparatus is described that includes a receiving circuit, a first and second antenna coupled to the receiving circuit, and a switch for coupling the first and second antenna to the receiving circuit. The networking apparatus additionally includes a signal processing circuit coupled to the receiving circuit, the signal processing circuit determining a first difference value for a first portion of a signal received using the first antenna when coupled to the receiving circuit during a first time period, the first difference value being a difference between a signal level for the first portion of the signal received using the first antenna and a threshold signal level associated with the first antenna, the signal processing circuit further determining a second difference value for the first portion of the signal received using the second antenna when coupled to the receiving circuit during a second time period, the second difference value being a difference between a signal level for the first portion of the signal received using the second antenna and a threshold signal level associated with the second antenna. The receiving circuit additionally receives a second portion of the signal using the first antenna when the signal processing circuit determines that the first difference value is greater than the second difference value.

According to the present disclosure, an apparatus is described that includes a memory that stores a threshold value associated with a first antenna and a threshold value associated with a second antenna. The apparatus further includes a processor configured to determine a first difference value for a first portion of a signal received using a first antenna when coupled to a receiving circuit during a first time period, the first difference value being a difference between a signal level for the first portion of the signal received using the first antenna and a threshold signal level associated with the first antenna, determine a second difference value for the first portion of the signal received using a second antenna when coupled to the receiving circuit during a second time period, the second difference value being a difference between a signal level for the first portion of the signal received using the second antenna and a threshold signal level associated with the second antenna. The processor is further configured to provide instructions to select the first antenna for receiving a second portion of the signal if the first difference value is greater than the second difference value.

In some embodiments, the threshold value associated with the first antenna and the threshold value associated with the second antenna are determined by measuring a first background signal level using the first antenna when coupled to the receiving circuit and measuring a second background signal level using the second antenna when coupled to the receiving circuit during a third time period when the signal is not transmitted. Further, in some embodiments, the threshold value associated with the first antenna and the threshold value associated with the second antenna are updated periodically.

In some embodiments, the threshold value associated with the first antenna is different from the threshold value associated with the second antenna.

In some embodiments, the second time period is different than the first time period.

In some embodiments, the first portion of the signal is a preamble for a frame of data. Further, in some embodiments, the first time period is less than the time period of one byte in the preamble.

In some embodiments, the signal uses a signal format that complies with the Zigbee protocol.

It is to be appreciated that, except where explicitly indicated in the description above, the various features shown and described are interchangeable, that is, a feature shown in one embodiment may be incorporated into another embodiment.

Although embodiments which incorporate the teachings of the present disclosure have been shown and described in detail herein, those skilled in the art can readily devise many other varied embodiments that still incorporate these teachings. Having described preferred embodiments of a method and apparatus for diversity antenna selection, it is noted that modifications and variations can be made by persons skilled in the art in light of the above teachings. It is therefore to be understood that changes may be made in the particular embodiments of the disclosure which are within the scope of the disclosure as outlined by the appended claims.

What is claimed is:

1. A method, comprising:
   receiving a first portion of a signal using a first antenna during a first time period and using a second antenna during a second time period;
   determining a first difference value for the first portion of the signal received by the first antenna, the first difference value being a difference between a signal level for the first portion of the signal received by the first antenna and a threshold signal level associated with the first antenna;
   determining a second difference value for the first portion of the signal received by the second antenna, the second difference value being a difference between a signal level for the first portion of the signal received by the second antenna and a threshold signal level associated with the second antenna; and
   receiving a second portion of the signal using the first antenna if the first difference value is greater than the second difference value.

2. The method of claim 1, wherein the threshold value associated with the first antenna is different from the threshold value associated with the second antenna.

3. The method of claim 1, wherein the second time period is different than the first time period.

4. The method of claim 1, wherein the threshold value associated with the first antenna and the threshold value associated with the second antenna are determined by measuring a first background signal level using the first antenna and measuring a second background signal level using the second antenna during a third time period when the signal is not transmitted.

5. The method of claim 4, wherein the threshold value associated with the first antenna and the threshold value associated with the second antenna are updated periodically.

6. The method of claim 1, wherein the first portion of the signal is a preamble for a frame of data.

7. The method of claim 6, wherein the first time period is less than the time period of one byte in the preamble.

8. The method of claim 1, wherein the signal uses a signal format that complies with the Zigbee protocol.

9. A networking apparatus, comprising:
   a receiving circuit;
   a first and second antenna coupled to the receiving circuit;
   a switch for coupling the first and second antenna to the receiving circuit; and
   a signal processing circuit coupled to the receiving circuit, the signal processing circuit determining a first difference value for a first portion of a signal received using the first antenna when coupled to the receiving circuit during a first time period, the first difference value being a difference between a signal level for the first portion of the signal received using the first antenna and a threshold signal level associated with the first antenna, the signal processing circuit further determining a second difference value for the first portion of the signal received using the second antenna when coupled to the receiving circuit during a second time period, the second difference value being a difference between a signal level for the first portion of the signal received using the second antenna and a threshold signal level associated with the second antenna,
   wherein the receiving circuit additionally receives a second portion of the signal using the first antenna when the signal processing circuit determines that the first difference value is greater than the second difference value.

10. The networking apparatus of claim 9, wherein the threshold value associated with the first antenna is different from the threshold value determined by the second antenna.

11. The networking apparatus of claim 9, wherein the second time period is different than the first time period.

12. The networking apparatus of claim 9, wherein the threshold value associated with the first antenna and the threshold value associated with the second antenna are determined by measuring a first background signal level using the first antenna when coupled to the receiving circuit and measuring a second background signal level using the second antenna when coupled to the receiving circuit during a third time period when the signal is not transmitted.

13. The networking apparatus of claim 12, wherein the threshold value associated with the first antenna and the threshold value associated with the second antenna are updated periodically.

14. The networking apparatus of claim 9, wherein the first portion of the signal is a preamble for a frame of data.

15. The networking apparatus of claim 14, wherein the first time period is less than the time period of one byte in the preamble.

16. The networking apparatus of claim 9, wherein the received signal uses a signal format that complies with the Zigbee protocol.

17. An apparatus, comprising:
   a memory that stores a threshold value associated with a first antenna and a threshold value associated with a second antenna; and
   a processor configured to determine a first difference value for a first portion of a signal received using a first antenna when coupled to a receiving circuit during a first time period, the first difference value being a difference between a signal level for the first portion of the signal received using the first antenna and a threshold signal level associated with the first antenna, determine a second difference value for the first portion of the signal received using a second antenna when coupled to the receiving circuit during a second time period, the second difference value being a difference between a signal level for the first portion of the signal received using the second antenna and a threshold signal level associated with the second antenna, the processor further being configured to provide instructions to select the first antenna for receiving a second portion of the signal if the first difference value is greater than the second difference value.

18. The apparatus of claim 17, wherein the threshold value associated with the first antenna is different from the threshold value associated with the second antenna.

19. The apparatus of claim 17, wherein the threshold value associated with the first antenna and the threshold value associated with the second antenna are determined by measuring a first background signal level using the first antenna when coupled to the receiving circuit and measuring a second background signal level using the second antenna when coupled to the receiving circuit during a third time period when the signal is not transmitted.

20. The apparatus of claim 17, wherein the first portion of the signal is a preamble for the frame of data.

\* \* \* \* \*